United States Patent
Yun et al.

(10) Patent No.: US 10,330,058 B2
(45) Date of Patent: Jun. 25, 2019

(54) AIR FILTER AND AIR CLEANER USING HIGH DENSITY FILTER PAPER AND VEHICLE USING THE SAME

(71) Applicants: Hyundai Motor Company, Seoul (KR); Kia Motors Corporation, Seoul (KR); Korea Filtration Technologies Co., Ltd., Pyeongtaek, Gyeonggi-do (KR)

(72) Inventors: Tae-Min Yun, Gyeonggi-do (KR); Chul-Kyu Kwack, Gyeonggi-do (KR); Young-Hae Kim, Incheon (KR); Kyung-Ho Hwang, Gyeonggi-do (KR)

(73) Assignees: Hyundai Motor Company, Seoul (KR); Kia Motors Corporation, Seoul (KR); Korea Filtration Technologies Co., Ltd., Pyeongtaek, Gyeonggi-do (KR)

( * ) Notice: Subject to any disclaimer, the term of this patent is extended or adjusted under 35 U.S.C. 154(b) by 261 days.

(21) Appl. No.: 15/350,396

(22) Filed: Nov. 14, 2016

(65) Prior Publication Data
US 2017/0335807 A1 Nov. 23, 2017

(30) Foreign Application Priority Data
May 18, 2016 (KR) .................. 10-2016-0060829

(51) Int. Cl.
*F02M 35/024* (2006.01)
*B01D 46/52* (2006.01)
(Continued)

(52) U.S. Cl.
CPC ..... *F02M 35/02458* (2013.01); *B01D 39/163* (2013.01); *B01D 46/0005* (2013.01);
(Continued)

(58) Field of Classification Search
CPC ............... B01D 46/522; B01D 46/521; B01D 46/0005; B01D 2275/10; B01D 2275/20;
(Continued)

(56) References Cited

U.S. PATENT DOCUMENTS 5,230,455 A * 7/1993 Price .................. B01D 46/0001
226/88
7,674,308 B2 * 3/2010 Krisko .................. B01D 45/16
55/502

(Continued)

FOREIGN PATENT DOCUMENTS

JP 2777195 B2 7/1998
JP 2006-122909 A 5/2006
(Continued)

*Primary Examiner* — Robert Clemente
(74) *Attorney, Agent, or Firm* — Mintz Levin Cohn Ferris Glovsky and Popeo, P.C.; Peter F. Corless

(57) ABSTRACT

Disclosed is an air filter using high density filter paper. The filter paper may include a thermally bonded non-woven fabric filter paper 10 having air permeability to filter foreign materials of passed polluted air and change the polluted air to fresh air. The non-woven fabric filter paper includes wrinkled portions 10-1 and 10-N that are folded at a predetermined interval. A thickness of the wrinkle portions 10-1 and 10-N are provided with dense layers 15 and 17 comprising a first polyethylene terephthalate (PET) fiber 20-2 that can shrink by heat and a second polyethylene terephthalate (PET) fiber 20-1 that deforms upon by heat treatment.

18 Claims, 8 Drawing Sheets

(51) Int. Cl.
  *B01D 39/16* (2006.01)
  *B01D 46/00* (2006.01)
  *F02M 35/104* (2006.01)
  *B01D 46/10* (2006.01)

(52) U.S. Cl.
  CPC ........... *B01D 46/10* (2013.01); *B01D 46/521* (2013.01); *F02M 35/104* (2013.01); *B01D 2275/10* (2013.01); *B01D 2275/20* (2013.01); *B01D 2279/60* (2013.01)

(58) Field of Classification Search
  CPC ......... B01D 2279/20; F02M 35/02458; F02M 35/0245; F02M 35/02491
  See application file for complete search history.

(56) References Cited

U.S. PATENT DOCUMENTS

2014/0360146 A1* 12/2014 Cambo .............. B01D 39/1623
　　　　　　　　　　　　　　　　　　　　55/486
2015/0007530 A1*  1/2015 Cho .................. F02M 35/0203
　　　　　　　　　　　　　　　　　　　　55/357

FOREIGN PATENT DOCUMENTS

| JP | 2006-272106 A | 10/2006 |
|---|---|---|
| KR | 2001-0008271 A | 2/2001 |
| KR | 10-2002-0072396 A | 9/2002 |
| KR | 10-0589480 B1 | 6/2006 |
| KR | 2008-0095615 A | 10/2008 |
| KR | 10-1449321 B1 | 10/2014 |

* cited by examiner

AIR FILTER AND AIR CLEANER USING HIGH DENSITY FILTER PAPER AND VEHICLE USING THE SAME

CROSS-REFERENCE TO RELATED APPLICATIONS

This application claims priority to Korean Patent Application No. 10-2016-0060829, filed on May 18, 2016, which is incorporated herein by reference in its entirety.

TECHNICAL FIELD

The present invention is related to an air filter, an air cleaner, and a vehicle using the same. In particular, the air cleaner may comprise high density filter paper thereby extending a use of recycled parts.

BACKGROUND OF THE INVENTION

Generally, an engine room of a vehicle includes an intake system that supplies fresh air to an engine, in which the intake system includes an air cleaner that filters foreign materials included in outside air introduced from the outside to make fresh air.

The air cleaner includes an air filter. The air filter having air permeability may include filter paper folded. The filter paper may be a non-woven fabric filter paper comprising of a fiber material and/or a paper air filter formed of filter paper of a paper material according to a kind of the paper filter.

Further, the air cleaner may be a lid type (or general type) or a drawer type according to a dismounting/mounting structure of the air filter. To this end, the air filter using the non-woven fabric filter paper basically includes a rubber seal for securing airtightness with a body of the air cleaner and a plastic frame to prevent its own shape from being deformed due to characteristics of the fiber material. Additionally, the air filter may be a fixing shaft non-application type air filter and a fixing shaft application type air filter according to whether to apply the fixing shaft for compression deformation of the rubber seal. Further, the air filter using filter paper includes urethane foam to secure airtightness with the body of the air cleaner while preventing the shape of the filter paper from being deformed.

Therefore, the fixing shaft non-application type air filter using the non-woven fabric filter paper and the air filter using filter paper are applied to the lid type (or general type) air cleaner and the fixing shaft application type air filter using the non-woven fabric filter paper is applied to the drawer type air cleaner.

However, the air filter using the non-woven fabric filter paper includes the rubber seal and the plastic frame or the rubber seal, the plastic frame, and the fixing shaft, such that it may have a complicated structure and may be very expensive and heavy.

On the other hand, the air filter using filter paper includes only the urethane foam, and as a result, may be advantageous in the structure, the cost, and the weight compared to the air filter using the non-woven fabric filter paper. However, when the air filter using filter paper is polluted with water or foreign materials, the air filter using filter paper may have reduced durability, and for example, when the air filter using filter paper contacts water, the air filter using filter paper may have a severely deformed shape.

In particular, the non-woven fabric applied to the air filter is manufactured by bonding with a binder and thus fibers are bonded to each other at their intersecting points, and a binder bonding type non-woven fabric may not deform a shoulder-customized shape structure. For example, "人"-shaped mountains adhere to each other to prevent a ventilating resistance from being increased. However, the plastic frame may not be recycled (reused). As a result, upon the replacement of the air filter, all the parts needs to be replaced, and therefore service cost may be increased and the parts are not recycled (reused), and therefore environmental pollution may be severe due to the increase in the number of parts.

The foregoing is intended merely to aid in the understanding of the background of the present invention, and is not intended to mean that the present invention falls within the purview of the related art that is already known to those skilled in the art.

SUMMARY OF THE INVENTION

In preferred aspects, the present invention provides an air filter and an air cleaner using high density filter paper. In particular, the high density filter paper may include a wrinkle portion continued by virtue of thermally bonded non-woven fabric filter paper having a dense layer deformed by heat and may have a shoulder-customized folding structure using a rigid rib spread at a 'ㄷ'-shaped interval to increase rigidity while reducing a ventilation resistance. As such, the number of recyclable (reusable) parts may be increased thereby reducing cost, a weight, and replacement cost and preventing environmental pollution.

Other aspects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In one aspect, an air filter using high density filter paper may comprise: a non-woven fabric filter paper configured to have air permeability and filter a foreign material of polluted air passing the air filter. Preferably, the non-woven fabric filter paper may be thermal bonded. In particular, the non-woven fabric filter paper may include a wrinkle portion that is continuously adjacent to each other and folded at a predetermined interval. The thickness of the wrinkle portion may be provided with a dense layer comprising a first polyethylene terephthalate (PET) fiber and a second polyethylene terephthalate (PET) fiber. In particular, upon heat treatment, the first PET fiber has greater shrinkage than the second PET and the second PET fiber is deformed. Preferably, the non-woven fabric filter paper may be a thermally bonded non-woven fabric filter paper.

The term "non-woven fabric" as used herein refers to a fabric material formed from long fibers, which may be bonded, pressed or spun-bonded by chemical, mechanical, heat or solvent treatments. A preferred non-woven fabric may include entangled fiber structure held or bonded using a binder material or adhesive, not woven nor knitted.

Unless otherwise indicated herein, the non-woven fabric filter paper may be a thermally bonded non-woven fabric filter paper, which may be formed by heat treatment.

Preferably, the polluted air passing the air filter may be changed into fresh air.

The term "dense layer" as used herein refers to a layer comprising densified fiber composition, or having an increased density ("high density") of the fiber composition thereof. Preferred dense layer may be formed with the first PET fiber may substantially shrink upon heat treatment thereby substantially reducing volume thereof and substantially increasing density of the fiber composition. Preferred dense layer may have a density ranging from about 300 kg/m³ to about 500 kg/m³, preferred middle layer may have a density ranging from about 80 kg/m³ to about 140 kg/m³, preferred bulky layer may have a density from about 20 kg/m³ to about 40 kg/m³.

The term "foreign material" as used herein refers to a material or substance, which does not constitute a part of an original design, component or composition. The foreign material may include extraneous substances introduced from, or unintentionally produced substances from the original material design.

The term "polluted air" as used herein refers to an air composition including foreign materials or substantially amount of the foreign materials that may be introduced from other sources, e.g. pollution, exhaust gas from vehicles, which does not naturally constituting atmospheric air composition of the earth.

The term "fresh air" as used herein refers to an air composition that suitably may include oxygen as much as the natural atmospheric air composition of the earth, for example, at least of about 20% of oxygen gas, and in addition, that may not contain polluting or hazardous materials such as particles, dust or emulsions introduced from industrial or external polluting sources such as vehicles, factories, sands and the like.

The term "non-woven fabric" as used herein refers to a fabric material formed from long fibers, which may be bonded, pressed or spun-bonded by chemical, mechanical, heat or solvent treatments. A preferred non-woven fabric may include entangled fiber structure held or bonded using a binder material or adhesive, not woven nor knitted.

Unless otherwise indicated herein, the non-woven fabric filter paper may be a thermally bonded non-woven fabric filter paper, which may be formed by heat treatment.

For instance, the second PET fiber included in the dense layer of the non-woven fabric filter paper may melt by heat treatment and serve as a binder or adhesive to form the thermally bonded non-woven fabric filter paper.

The second PET fiber may have a diameter of 15 μm and a content of the first PET may be of about 5 to 20 wt % based on the total weight of the dense layer. The dense layers may be formed by applying heat such as hot wind in the heat treatment process such that the first PET fiber may shrink and bind to the second PET fiber.

Preferably, the dense layer may comprise an inner dense layer comprising the second PET fiber and an outer dense layer comprising the PET fiber in contact with the second PET fiber. The inner dense layer may be further provided with an intermediate layer and a bulky layer at the other side provided with the outer dense layer. Preferably, the intermediate layer may be connected to the inner dense layer and the bulky layer is connected to the intermediate layer.

The predetermined interval of the wrinkle portion may be equal in the entire section of a front end that is one end portion of the thermal bonding non-woven fabric filter paper and a rear end that is an end portion of the other side, the equal interval suitably may form, for instance, the wrinkle portion as a " ⊏ "-shaped rigid rib, and the rigid rib may be continuously formed by folding the wrinkle portion in a shoulder-customized structure in the whole section of the thermal bonding non-woven fabric filter paper. Other constitutions of the wrinkle portion also will be suitable, for instance, different shaped rib features, or other topography.

The thermally bonded non-woven fabric filter paper may be formed in a rectangular body and may be thus inserted into an internal space of the plastic frame so that rear, left, and right surfaces thereof may adhere to the plastic frame. In addition, the thermally bonded non-woven fabric filter paper may adhere to urethane foam which overlaps on an upper surface of an edge of the plastic frame and locking shafts adhere to left and right side surfaces of the plastic frame.

In another aspect of the present invention, an air cleaner may include: an air filter comprising a non-woven fabric filter paper comprising a wrinkle portion filtering foreign materials of polluted air and changing the polluted air to fresh air, formed in a shoulder-customized structure of a " ⊏ "-shaped rigid rib to increase air permeability and rigidity and comprising a dense layer of a first polyethylene terephthalate (PET) fiber and a second polyethylene terephthalate (PET) fiber; a plastic frame provided with an internal space into which the thermally bonded non-woven fabric filter paper having a rectangular parallelepiped shape is inserted, an urethane foam coupled to an upper surface of an edge of the plastic frame, locking shafts coupled to left and right side surfaces of the plastic frame; an air cleaner body comprising a filter receiving space into or out which the air filter is inserted or taken from above; and a cover configured to be coupled to the air cleaner body to open and close the upper surface of the filter receiving space in an up-and-down folding-out manner.

Preferably, the non-woven fabric filter paper may be thermal bonded.

The air cleaner body may further be provided with a cover configured to form the filter receiving space on an upper surface to insert or take out the air filter from the upper surface and open and close the filter receiving space in an up-and-down folding-out manner.

Preferably, the air filter may comprise the urethane foam to press the non-woven fabric filter paper, e.g. thermally bonded non-woven fabric filter paper, from an upper side thereof.

The air cleaner further comprise a sliding door configured to form the filter receiving space on one side surface to insert or take out the air filter in a drawing manner and open and close the filter receiving space in a sliding manner.

Preferably, the air filter may comprise a plastic frame provided with an internal space to have front, rear, left, and right surfaces of the thermally bonded non-woven fabric filter paper adhere to and inserted into the same, the urethane foam that overlaps on an upper surface of an edge of the plastic frame to press the non-woven fabric filter paper from an upper side, and locking shafts coupled to left and right side surfaces of the plastic frame.

In accordance with still another embodiment of the present invention, an air cleaner may comprise: an air filter comprising the thermally bonded non-woven fabric filter paper that comprises a wrinkle portion filtering foreign materials of polluted air and changing the polluted air to fresh air formed in a shoulder-customized structure of a " ⊏ "-shaped rigid rib to increase air permeability and rigidity and comprises a dense layer comprising a first polyethylene terephthalate (PET) fiber and a second polyethylene terephthalate (PET) fiber; a plastic frame comprising an internal space into which the thermally bonded non-woven fabric filter paper having a rectangular parallelepiped shape is inserted, an urethane foam coupled to an upper surface of an edge of the plastic frame, and locking shafts coupled to left and right side surfaces of the plastic frame; an air cleaner body configured to have a filter receiving space into or out which the air filter is inserted or taken in a drawing manner formed on one side surface thereof; and a sliding door configured to be coupled to the air cleaner body to open and close a side inlet of the filter receiving space in a sliding manner.

In accordance with still yet another embodiment of the present invention, a vehicle may comprise: an air cleaner comprising an air filter using a non-woven fabric filter paper that comprises a wrinkle portion filtering foreign materials of polluted air and changing the polluted air to fresh air formed in a shoulder-customized structure of a " ⊏ "-shaped rigid rib to increase air permeability and rigidity and comprises a dense layer comprising a first polyethylene terephthalate (PET) fiber and a second polyethylene terephthalate (PET) fiber; and an intake manifold configured to supply fresh air from which foreign materials of outside air introduced into the air cleaner are filtered to an engine.

In particular, upon heat treatment, the first PET fiber may have greater shrinkage than the second PET and the second PET fiber may be deformed. Preferably, the non-woven fabric filter paper may be thermal bonded.

Preferably, the intake system may include an intake manifold in which the fresh air flows.

Other aspects of the invention are disclosed infra.

BRIEF DESCRIPTION OF THE DRAWINGS

It should be understood that the accompanying drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing The above and other objects, features and advantages of the present invention will be more clearly understood from the following detailed description taken in conjunction with the accompanying drawings, in which.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, embodiments of the present invention will be described in detail with reference to the accompanying drawings and these embodiments may be implemented in various forms by a person having ordinary skill in the art to which the present invention pertains and therefore the present invention is not limited to the embodiments described herein.

Figure 1:
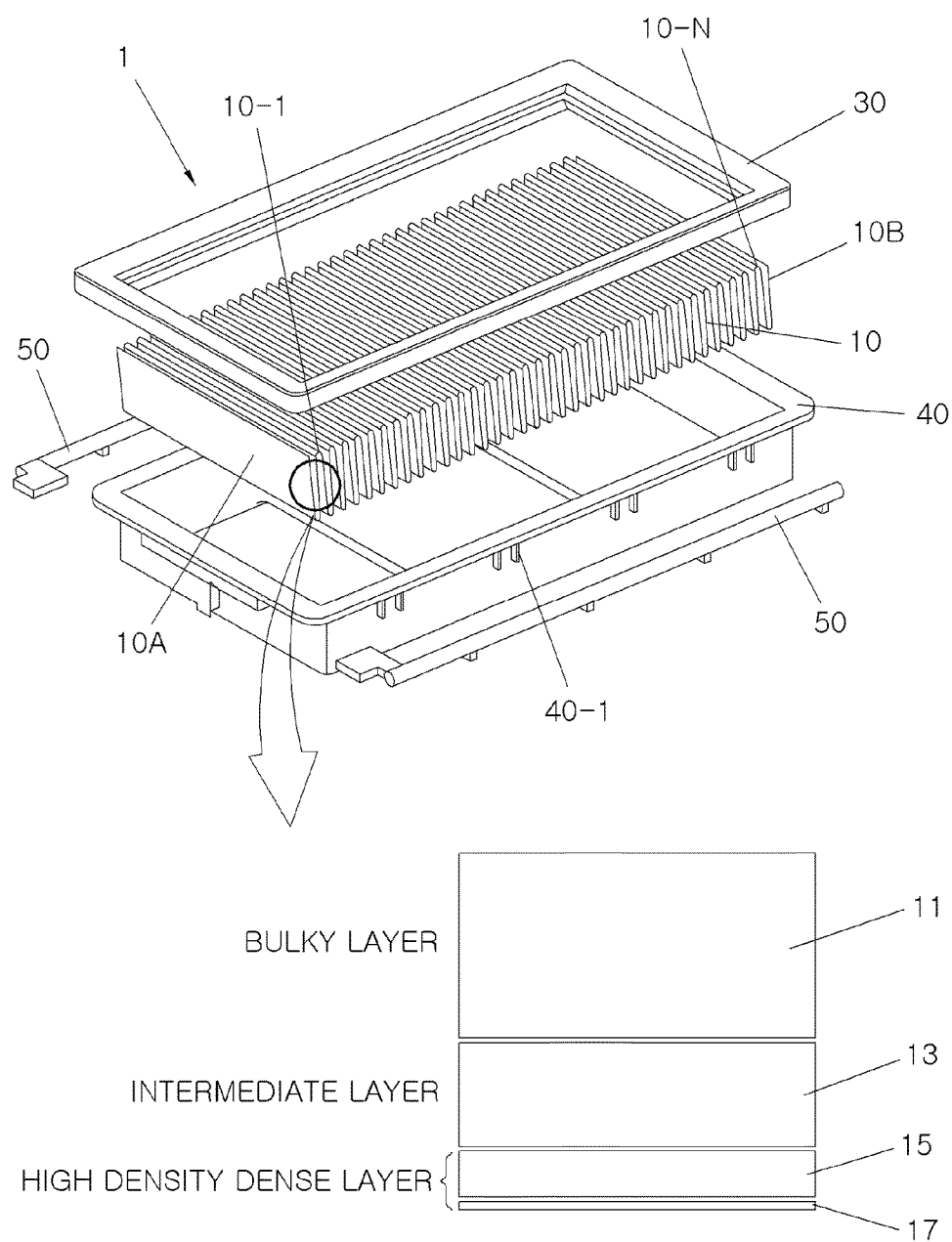
FIG. 1 illustrates an exemplary air filter comprising high density filter paper according to an exemplary embodiment of the present invention has and frame structure thereof.

FIG. 1 illustrates an exemplary frame air filter 1 using high density filter paper. As illustrated in FIG. 1, the frame air filter 1 includes thermally bonded non-woven filter paper 10, urethane foam 30, a plastic frame 40, and locking shafts 50. The thermally bonded non-woven filter paper 10 and the urethane foam 30 may not be recycled but the plastic frame 40 and the locking shaft 50 are recycled.

In an exemplary embodiment, the thermally bonded non-woven fabric filter paper 10 may have a rectangular parallelepiped shape (rectangular body) with first to $N^{th}$ wrinkled portions such as 10-1, . . . , 10-N. The wrinkled portions may be adjacently folded to each other so that a front end 10A which is one end portion and a rear end 10B which is the other end portion may have a predetermined length and width and the front end 10A and the rear end 10B may have a predetermined height and interval. A folded interval of the first, . . . , N-th wrinkle portions 10-1, . . . , 10-N may be a predetermined interval (for example, rigid rib 10D of FIG. 3) at which each of the first to $N^{th}$ wrinkle portions 10-1, . . . , 10-N) may have air permeability. Further, a thickness of the thermally bonded non-woven fabric filter paper 10 may include a bulky layer 11, an intermediate layer 13, and a high density dense layer (or "dense layer"), and the high density dense layer may include an inner dense layer 15 and an outer dense layer 17. For example, the bulky layer 11 may be connected to the intermediate layer 13, the intermediate layer 13 may be connected to the inner dense layer 15, and the inner dense layer 15 may be connected to the outer dense layer 17. That is, based on the bulky layer 11, the intermediate layer 13 may be connected to one surface of the bulky layer 11, the inner dense layer 15 may be connected to one surface of the intermediate layer 13, and the outer dense layer 17 may be connected to one surface of the inner dense layer 15. As consequence, the bulky layer 11 may form one surface of the thermally bonded non-woven fabric filter paper 10 and the outer dense layer 17 may form the other surface of the thermally bonded non-woven fabric filter paper 10.

In an exemplary embodiment, the urethane foam 30 may be positioned at an edge of the plastic frame 40 to secure airtightness of an edge portion of the thermally bonded non-woven fabric filter paper 10.

In an exemplary embodiment, the plastic frame 40 may provide a frame filled with the thermally bonded non-woven fabric filter paper 10 to secure durability while maintaining a shape of the thermally bonded non-woven fabric filter paper 10.

In an exemplary embodiment, the locking shaft 50 may be formed as a rod shaft connected to a handle which may be gripped with a hand and may be coupled to shaft clips 40-1 provided at left and right side surfaces of the plastic frame 40.

Figure 2:
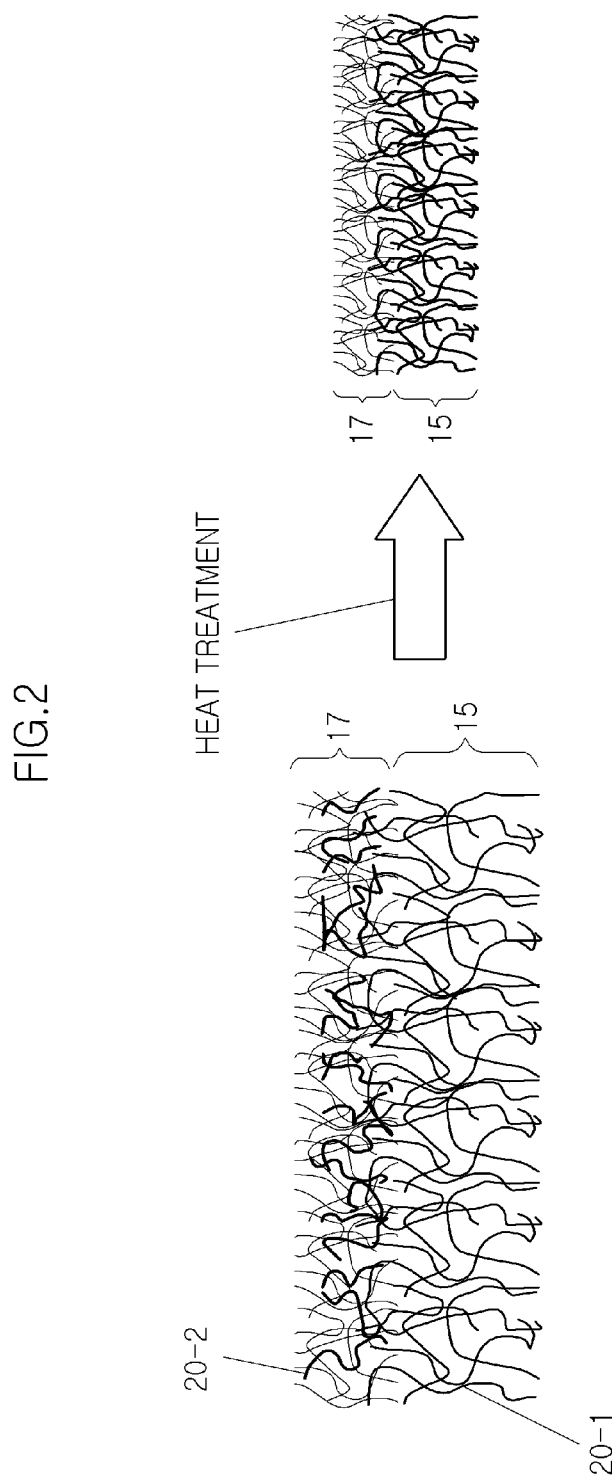
FIG. 2 illustrates an exemplary dense layer of an exemplary thermally bonded non-woven fabric filter paper according to an exemplary embodiment of the present invention.

Meanwhile, FIG. 2 illustrates an exemplary process of manufacturing the inner dense layer 15 and the outer dense layer 17, which may form a high density dense layer ("dense layer") of the thermally bonded non-woven filter paper 10. As illustrated in FIG. 2, the high density dense layer may include i) a highly shrinkable polyethylene terephthalate (PET) fiber 20-2 mixed in an amount of about 5 to 20% based on the total weight of the high density dense layer and ii) a binder polyethylene terephthalate (PET) fiber 20-1 having a diameter of about 15 μm. During a heat treatment process among processes of manufacturing filter paper, hot wind may be applied to the second PET fiber 20-1 and the first PET fiber 20-2 for coupling therebetween to form the outer dense layer 17, for example, because the first PET fiber 20-2 may be shrunk greater than the inner dense layer 15. As a result, the inner dense layer 15 and the outer dense layer 17 may be formed of the high density dense layer, such that the thermally bonded non-woven filter paper 10 may be formed to have high density.

Figure 3:
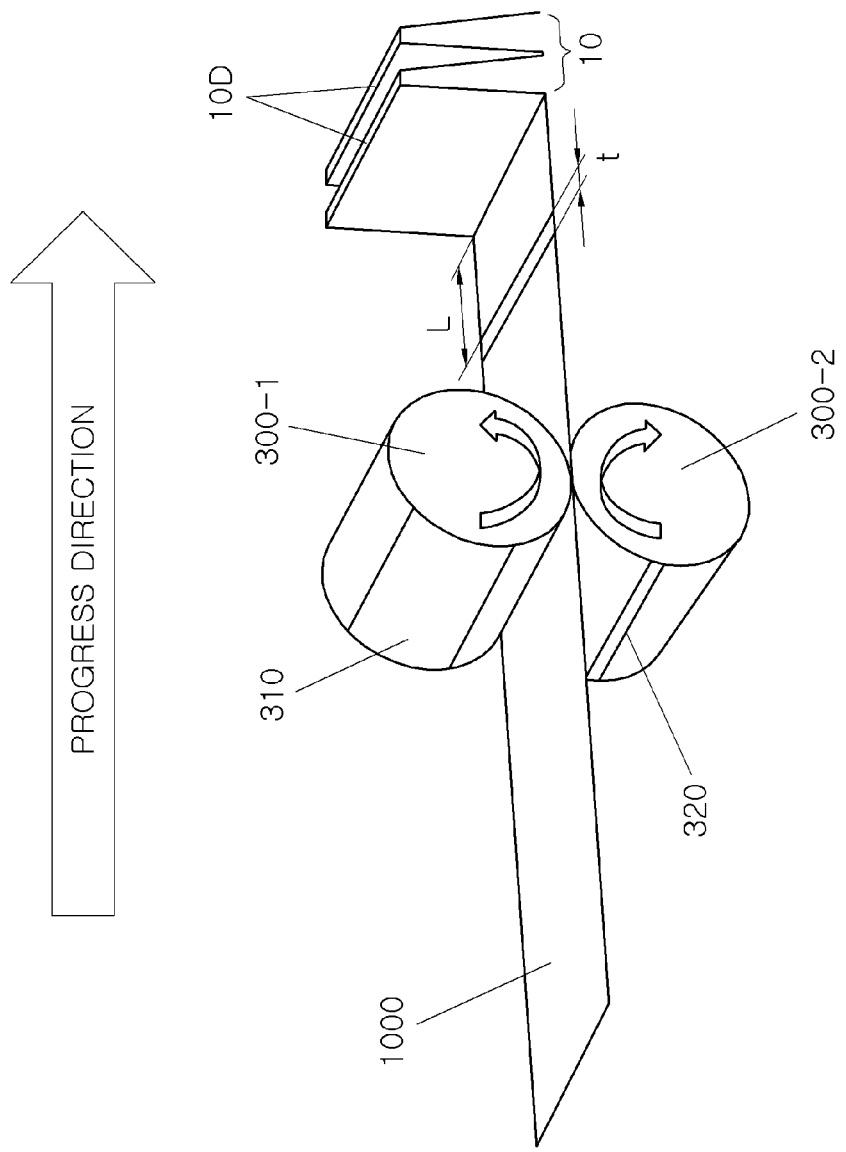
FIG. 3 illustrates an exemplary thermally bonding non-woven fabric filter paper according to an exemplary embodiment of the present invention having in a " ⊏ " shape.

Meanwhile, FIG. 3 illustrates a state in which the thermally bonded non-woven fabric filter paper 10 may be manufactured in a "⌐" shape. As illustrated in FIG. 3, the thermally bonded non-woven fabric filter paper 10 may be folded at a predetermined folding size while passing the thermal bonding non-woven fabric filter paper 10 through a pair of upper and lower rollers 300-1 and 300-2, a rigid rib 10D may be continued at a straight section. For example, the upper roller 300-1 may be provided with a size forming part 310 defining the folding size at one surface interval L and the lower roller 300-2 may be provided with a rib forming part 320 forming the rigid rib 10D at an interval t between adjacent surfaces. Therefore, the pair of rotating upper and lower rollers 300-1 and 300-2 may pass through a thermally bonded non-woven fabric filter paper material 1000. In the process, the size forming part 310 of the upper roller 300-1 may fold the thermally bonded non-woven fabric filter paper material 1000 at a predetermined one surface interval L. In particular, at the same time, the rib forming part 320 of the lower roller 300-2 may form the rigid rib 10D at the interval t between the adjacent one surface interval L, such that the thermally bonded non-woven fabric filter paper 10 may be folded while the rigid rib 10D having a trapezoidal shape may be continuously formed. Next, the trapezoidal shape of the rigid rib 10D may have a "⌐" shape due to the adhesion of the rigid rib 10D, and thus a shoulder-customized folding structure spread at the "⌐"-shaped interval can be completed. In this case, the rigid rib 10D may be formed by a pressing force of the lower roller 300-2.

Therefore, the thermally bonded non-woven fabric filter paper 10 having the high density dense layer may provide the following advantages as compared to a binder bonding type non-woven fabric. Here, the thermal bonding refers to a method for manufacturing a dry non-woven fabric, for example, which may be manufactured by a cotton mixing process, a card web process, a heat fusion process, and a winding process and the binder bonding refers to a manufacturing method of adding a binder to bond fibers to each other at their intersecting points.

Figure 6:
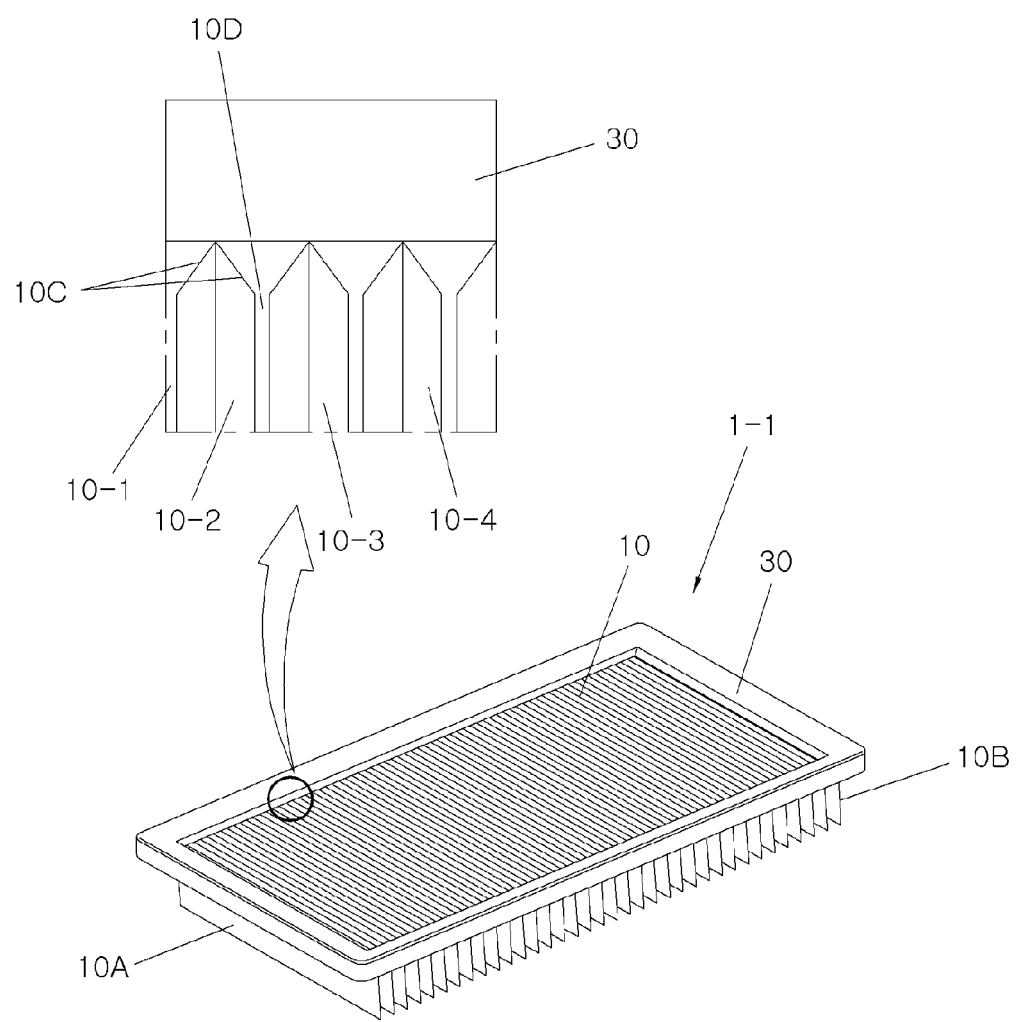
FIG. 6 illustrates an exemplary air filter using high density filter paper according to an exemplary embodiment of the present invention has a frameless structure.

The thermally bonded non-woven fabric filter paper may be deformed by heat, and thus the shoulder-customized folding structure using the rigid rib 10D spread at the "⌐"-shaped interval to prevent a ventilation resistance from being increased may be easily applied. Subsequently, as shown in FIG. 6, due to the rigidity reinforcement by means of a surface pressure dispersion by the "⌐"-shaped rigidity rib 10D and high dust removal efficiency by means of the reduction in the ventilation resistance, the plastic frame 40 and the locking shaft 50 may be deleted and therefore a frameless air filter 1-1 may be used.

Figure 4:
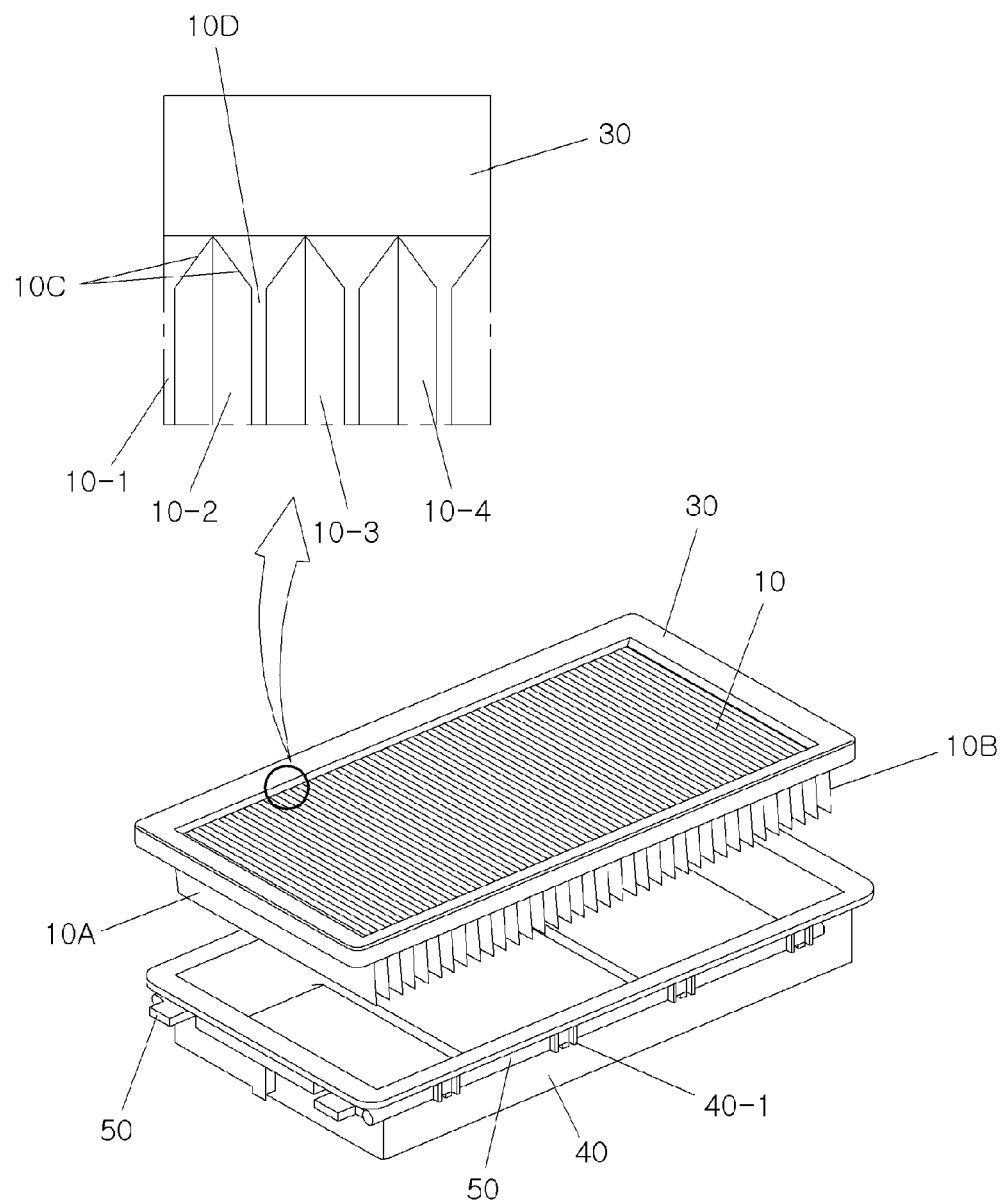
FIG. 4 illustrates an exemplary assembly of the thermally bonded non-woven fabric filter paper according to an exemplary embodiment of the present invention.

Meanwhile, FIG. 4 illustrates an exemplary assembly of an exemplary thermally bonded non-woven fabric filter paper 10.

The thermally bonded non-woven fabric filter paper 10 may form the first to $N^{th}$ wrinkled portions such as 10-1, . . . , 10-N at the section of the front end 10A and the rear end 10B. The first to $N^{th}$ wrinkled portions 10-1 and 10-N may be formed in the shoulder-customized folding structure having a ventilation interval due to the "⌐"-shaped rigidity rib 10D and thus may have a rectangular parallelepiped shape without increasing the ventilation resistance compared to the structure in which the rigidity rib 10D is not formed.

The thermally bonded non-woven filter paper 10 may be inserted into an internal space of the plastic frame in a rectangular body form to adhere and be fixed to front, rear, left, and right wall surfaces of the plastic frame 40, respectively and may be inserted into an internal space of the urethane foam 30 that may overlap on an upper surface of the edge of the plastic frame 40 to be simply assembled.

In an exemplary embodiment, the locking shaft 50 may be coupled to the shaft clip 40-1 at the left and right side surfaces of the plastic frame 40. The locking shaft 50 may be rotated by an operation (counterclockwise operation for unlock or clockwise operation for lock) of the handle. As a result, the operation of the locking shaft 50 may move the plastic frame 40 to compress the urethane foam 30 to secure the airtightness of the frame air filer 1 that is mounted in the air cleaner.

Figure 5:
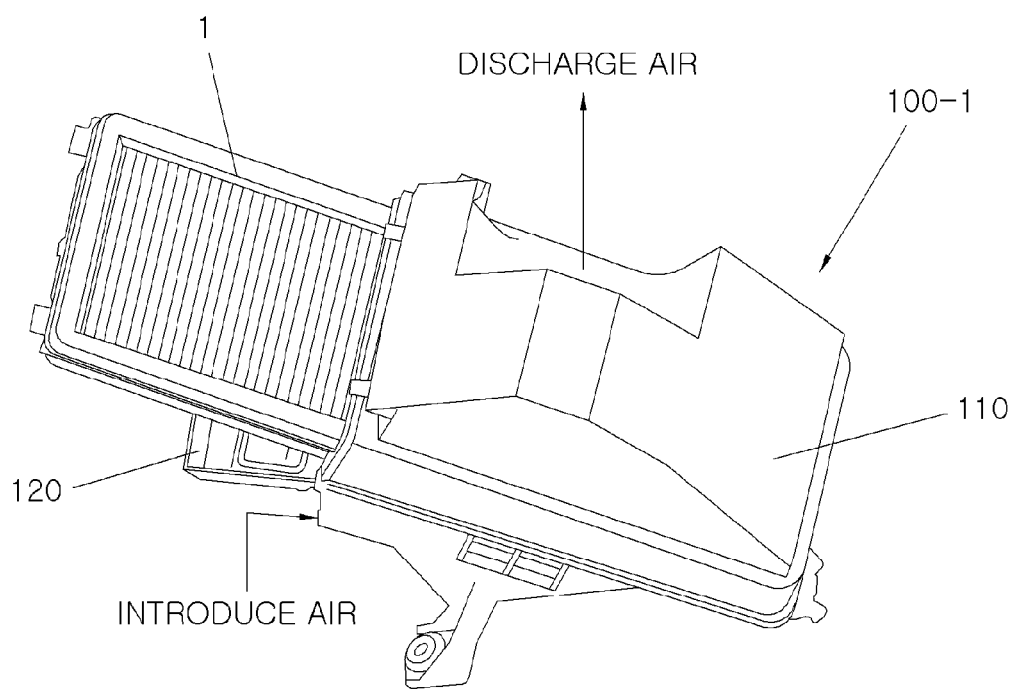
FIG. 5 illustrates an exemplary drawer type air cleaner including the air filter using high density frame paper having a frame structure according to an exemplary embodiment of the present invention.

Meanwhile, FIG. 5 illustrates an exemplary drawer type air cleaner 100-1. As illustrated in FIG. 5, the drawer type air cleaner 100-1 may include an air cleaner body 110 having a filter receiving space into or out where the frame air filter 1 may be inserted or taken in a drawing manner disposed on one side surface thereof and a sliding door 120 coupled to the air cleaner body 110 via a door hinge so that a side inlet of the filter receiving space may be opened and closed in a sliding manner.

Further, the drawer type air cleaner 100-1 may be further provided with an air cleaner sub body that may be integrated with the air cleaner body 110 or may be coupled to the air cleaner body 110. The air cleaner sub body may serve as a mounting bracket coupled to the intake system, and the like, which may introduce outside air into the air cleaner body 110 and may discharge fresh air from which foreign materials are removed via the frame air filter 1, and may supply the fresh air to the engine.

In particular, the frame air filter 1 may include the thermal bonding non-woven fabric filter paper 10, the urethane foam 30, the plastic frame 40, and the locking shaft 50, and accordingly, may be the same as the frame air filter 1 using high density filter paper in FIGS. 1 to 3.

As such, upon the replacement of the used frame air filter 1 in the drawer type air cleaner 100-1, the sliding door 120 may be open to take out the used frame air filter 1 and then the used thermal bonding non-woven fabric filter paper 10, and the used urethane foam 30 in the plastic frame 40 coupled to the locking shaft 50 may be replaced by a new product, thereby replacing the used frame air filter 1 with a new product. As a result, in the drawer type air cleaner 100-1, costs caused by the filter replacement may be minimized and the environmental pollution may also be minimized due to the recycle of the plastic frame 40 and the locking shaft 50.

Figure 7:
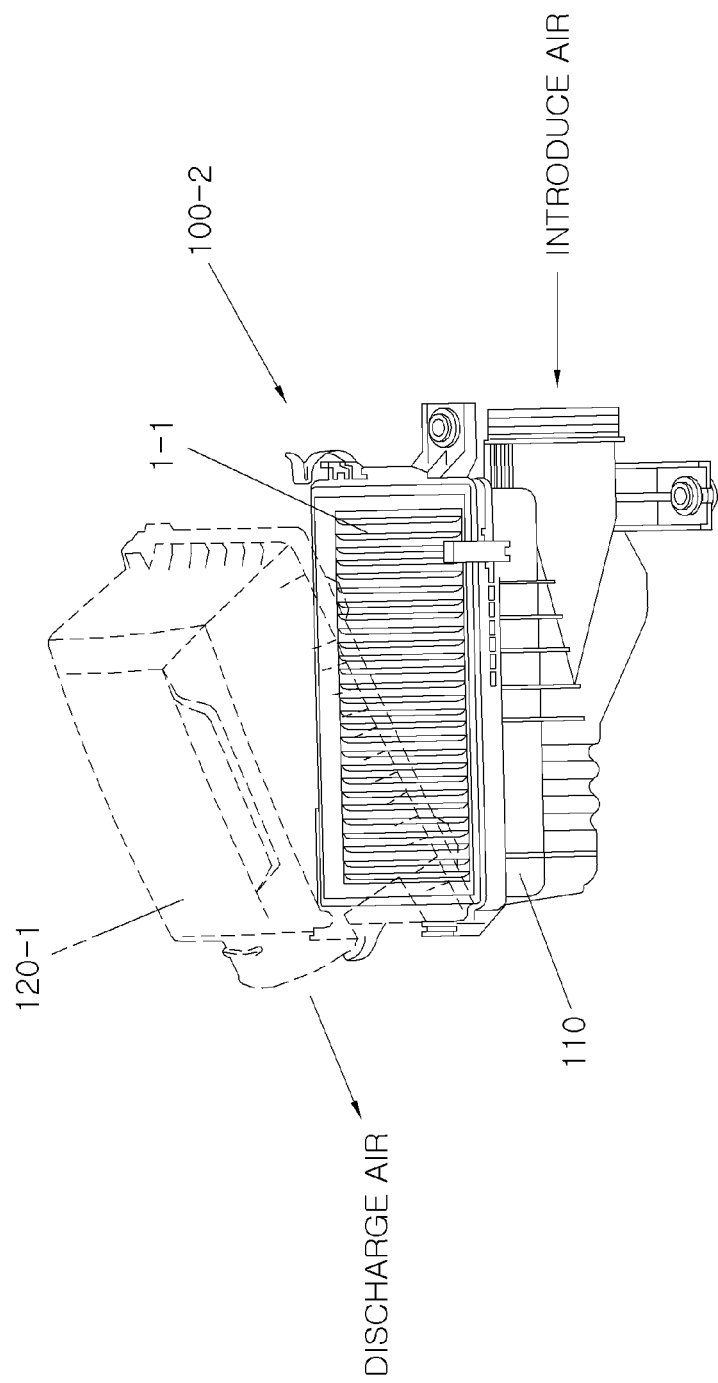
FIG. 7 illustrates an exemplary lid type (or general type) air cleaner comprising an exemplary air filter using high density frame paper having the frameless structure according to an exemplary embodiment of the present invention.

Meanwhile, FIGS. 6 and 7 illustrate, respectively, an exemplary frameless air filter 1-1 using high density filter paper and an exemplary lid type (or general type) air cleaner 100-2.

Referring to FIG. 6, the frameless air filter 1-1 is configured to include the thermally bonded non-woven fabric filter paper 10 that may not be recycled and the urethane foam 30. The thermally bonded non-woven fabric filter paper 10 and the urethane foam 30 may be the same as the thermal bonding non-woven fabric filter paper 10 of FIGS. 1 to 3.

Referring to FIG. 7, the lid type air cleaner 100-2 may include the air cleaner body 110 in which the filter receiving space in or out which the frameless air filter 1-1 may be inserted or taken from above may be formed on an upper surface and a cover 120-1 coupled to the air cleaner body 110 via the door hinge so that an upper space of the filter receiving space may be opened and closed in an up-and-down folding-out manner.

Further, the drawer type air cleaner 100-2 may be further provided with the air cleaner sub body that may be integrated with the air cleaner body 110 or may be coupled to the air cleaner body 110. The air cleaner sub body may serve as a mounting bracket coupled to the intake system, and the like, for example, which may introduce outside air into the air cleaner body 110 and discharge fresh air from which foreign materials are removed via the frameless air filter 1-1, and may supply the fresh air to the engine.

Therefore, upon the replacement of the used frameless air filter 1-1, the used thermally bonded non-woven fabric filter paper 10 and the used urethane foam 30 in the used frameless air filter 1-1 may not be recycled, and therefore the cover 120-1 may be opened to take out the used frameless air filter 1-1. As such, the used frameless air filter 1-1 may be replaced by a new product. However, unlike the frame air filter 1, the frameless air filter 1-1 may not use the plastic frame 40 and the locking shaft 50 that are a recycled part, such that it may have a simple structure.

Figure 8:
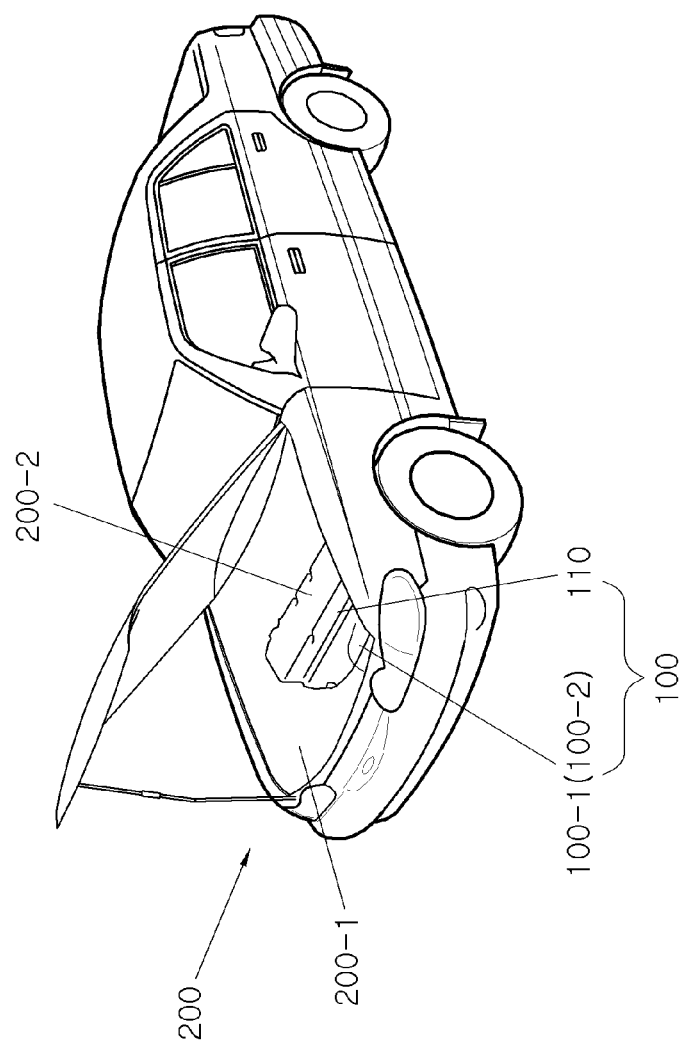
FIG. 8 illustrates an exemplary vehicle comprising an exemplary intake system including an exemplary air cleaner according to an exemplary embodiment of the present invention.

Meanwhile, FIG. 8 illustrates an exemplary open portion of the engine room 200-1. As illustrated in FIG. 8, the engine room 200-1 of the vehicle may be provided with the intake system 100 along with the engine 200-2.

For example, the engine 200-2 may be various kinds of engine such as a gasoline engine, a diesel engine, an LPG engine, and a CNG engine.

For example, the intake system 100 may include an intake manifold 110 for supplying fresh air to the engine 200-2 and the air manifold 110 may be connected to the drawer type air cleaner 100-1 to which the frame air filter 1 may be applied to supply fresh air or the lid type air cleaner 100-2 to which the frameless air filter 1-1 may be applied. Therefore, the drawer type air cleaner 100-1 may be the same as the drawer type air cleaner 100-1 illustrated in FIG. 5 and the lid type air cleaner 100-2 may be the same as the lid type air cleaner 100-2 illustrated in FIG. 7.

As such, the frame air filter 1 or the frameless air filter 1-1 may include the thermally bonded non-woven fabric filter paper 10 using the high density dense layer, such that the use of recycled parts that may not cause the environmental pollution may be extended.

As described above, the air filter comprising high density filter paper according to the exemplary embodiment of the present invention may include the high density dense layers 15 and 17 provided at the thickness of the folded portions 10-1 and 10-N filtering foreign materials of passed polluted air and changing the polluted air to fresh air, may include the thermally bonded non-woven filter paper 10 using the " 匸 "-shaped rigid rib 10D reducing the ventilation resistance and increasing the rigidity due to the high density dense layers 15 and 17. In particular, the high density dense layers may be formed using highly shrinkable polyethylene terephthalate (PET) fiber 20-2 and the binder polyethylene terephthalate (PET) fiber 20-1 and are thus easily deformed by heat. In addition, the air filter comprising high density filter paper may be applied to the drawer type air cleaner 100-1 and the lid type air cleaner 100-2 to configure the intake system 100 of the vehicle 200, thereby reducing the cost, the weight, and the replacement cost, and in particular, increasing the number of recyclable (or reusable) parts to prevent the environmental pollution.

According to the exemplary embodiments of the present invention, the high density filter paper may have the high density dense layer to achieve the combination of the merits of the non-woven fabric filter paper with the merits of the filter paper to thereby make the structure of the air filter simple. In particular, the bent structure having the mountain shape, which maintains shoulder-customized shape structure in which mountains adhere to each other, may be deformed to improve the durability and rigidity of the air filter.

Further, according to the exemplary embodiments of the present invention, the air filter using the high density filter paper may have the cost and weight less than those of the conventional non-woven fabric bonded with a binder, and in particular, the plastic frame and the shaft may be deleted or recycled (or reused).

Further, according to the exemplary embodiments of the present invention, the air cleaner comprising the air filter using high density filter paper may obtain about 13% decrease in cost, about 32% decrease in weight, and about 13% decrease in air filter replacement cost compared to the lid type (or general type) air cleaner and thus, have about 3.4% decrease in cost, about 9.4% decrease in weight, and about 40% decrease in air filter replacement cost compared to the drawer type air cleaner.

Further, according to the exemplary embodiments of the present invention, the air cleaner comprising the air filter using high density filter paper and the vehicle comprising the intake system using the same may recycle the plastic frame, the shaft and the like, upon the replacement of the air filter to reduce the discarded part to the non-woven filter paper and the urethane foam, thereby preventing the environmental pollution.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. An air filter, comprising:
   a non-woven fabric filter paper configured to have air permeability and filter a foreign material of polluted air passing the air filter,
   wherein the non-woven fabric filter paper comprises a wrinkle portion folded at a predetermined interval and the wrinkle portion comprises a dense layer comprising a first polyethylene terephthalate (PET) fiber and a second polyethylene terephthalate (PET) fiber,
   wherein, upon heat treatment, the first PET fiber has greater shrinkage than the second PET and the second PET fiber is deformed,
   wherein the dense layer comprises an inner dense layer comprising the second PET fiber and an outer dense layer comprising the first PET fiber in contact with the second PET fiber.

2. The air filter of claim 1, wherein the polluted air passing the air filter is changed into fresh air.

3. The air filter of claim 1, wherein the non-woven fabric filter paper is thermally bonded.

4. The air filter of claim 1, wherein the second PET fiber has a diameter of about 15 .mu.m and a content of the first PET is of about 5 to 20 wt % based on the total weight of the dense layer.

5. The air filter of claim 4, wherein the dense layer is formed by applying hot wind in the heat treatment process such that the first PET fiber binds to the second PET fiber.

6. The air filter of claim 1, wherein the inner dense layer further comprises an intermediate layer and a bulky layer at the other side provided with the outer dense layer.

7. The air filter of claim 6, wherein the intermediate layer is connected to the inner dense layer and the bulky layer is connected to the intermediate layer.

8. The air filter of claim 1, wherein the predetermined interval of the wrinkle portion is equal in entire section of a front end that is one end portion of the non-woven fabric filter paper and a rear end that is an end portion of the other side.

9. The air filter of claim 8, wherein the equal interval forms the wrinkle portion as a rigid rib.

10. The air filter of claim 9, wherein the rigid rib is continuously formed by folding the wrinkle portion in a shoulder-customized structure in the entire section of the non-woven fabric filter paper.

11. An air cleaner, comprising:
    an air filter comprising a non-woven fabric filter paper of claim 1;
    a plastic frame comprising an internal space into which the non-woven fabric filter paper having a rectangular parallelepiped shape is inserted, an urethane foam coupled to an upper surface of an edge of the plastic frame, and locking shafts coupled to left and right side surfaces of the plastic frame; and
    an air cleaner body comprising a filter receiving space into or out which the air filter is inserted or taken.

12. The air cleaner of claim 11, wherein the non-woven fabric filter paper is thermally bonded.

13. The air cleaner of claim 11, wherein the air filter comprises the urethane foam to press the non-woven fabric filter paper from an upper side thereof.

14. The air cleaner of claim 11, wherein the air cleaner further comprises a sliding door configured to form the filter receiving space on one side surface to insert or take out the air filter in a drawing manner and open and close the filter receiving space in a sliding manner.

15. The air cleaner of claim 14, wherein the air filter comprises a plastic frame provided with an internal space to have front, rear, left, and right surfaces of the non-woven fabric filter paper adhere to and inserted into the same, the urethane foam that overlaps on an upper surface of an edge of the plastic frame to press the non-woven fabric filter paper from an upper side, and locking shafts coupled to left and right side surfaces of the plastic frame.

16. A vehicle, comprising:
    an intake system configured to supply fresh air from which foreign materials of outside air introduced into air cleaner is filtered to an engine, the air cleaner including an air filter using a non-woven fabric filter paper of claim 1.

17. The vehicle of claim 16, wherein the non-woven fabric filter paper that has a wrinkle portion filtering foreign materials of polluted air and changing the polluted air to fresh air formed in a shoulder-customized structure of a rigid rib to increase air permeability and rigidity and comprises a dense layer of a first polyethylene terephthalate (PET) fiber and a second polyethylene teraphthalate (PET) fiber, and
    wherein, upon heat treatment, the first PET fiber has greater shrinkage than the second PET and the second PET fiber is deformed.

18. The vehicle of claim 16, wherein the intake system comprises an intake manifold in which the fresh air flows.

* * * * *